(12) United States Patent
Wang et al.

(10) Patent No.: US 10,198,563 B2
(45) Date of Patent: Feb. 5, 2019

(54) METHODS AND APPARATUSES FOR CONTROLLING STATE OF TERMINAL SCREEN

(71) Applicant: Xiaomi Inc., Beijing (CN)

(72) Inventors: Yanteng Wang, Beijing (CN); Zhijie Li, Beijing (CN); Jie Fan, Beijing (CN)

(73) Assignee: Xiaomi Inc., Beijing (CN)

( * ) Notice: Subject to any disclaimer, the term of this patent is extended or adjusted under 35 U.S.C. 154(b) by 196 days.

(21) Appl. No.: 15/070,365

(22) Filed: Mar. 15, 2016

(65) Prior Publication Data

US 2016/0275275 A1   Sep. 22, 2016

(30) Foreign Application Priority Data

Mar. 20, 2015 (CN) .......................... 2015 1 0126338

(51) Int. Cl.
*G07C 9/00* (2006.01)
*H04M 1/67* (2006.01)
(Continued)

(52) U.S. Cl.
CPC .............. *G06F 21/31* (2013.01); *G06F 21/35* (2013.01); *H04L 63/0853* (2013.01);
(Continued)

(58) Field of Classification Search
None
See application file for complete search history.

(56) References Cited

U.S. PATENT DOCUMENTS 7,202,773 B1    4/2007   Oba et al.
8,866,760 B2   10/2014   Corroy et al.
(Continued)

FOREIGN PATENT DOCUMENTS

CN   101866152 A   10/2010
CN   102202294 A    9/2011
(Continued)

OTHER PUBLICATIONS

International Search Report of PCT/CN2015/093292, mailed from the State Intellectual Property Office of China dated Jan. 11, 2016.
(Continued)

*Primary Examiner* — Christopher A Revak
(74) *Attorney, Agent, or Firm* — Finnegan, Henderson, Farabow, Garrett & Dunner LLP

(57) ABSTRACT

A method for controlling a screen of a terminal, includes: determining a real-time state of the screen as a first state; generating a first electromagnetic signal corresponding to the first state, and sending the first electromagnetic signal to a metal structure on a surface of the terminal through a first human body communication component, such that the first electromagnetic signal is transmitted via a skin of a user; receiving, by the first human body communication component via the metal structure, a second electromagnetic signal sent by a wearable device associated with the terminal, the second electromagnetic signal being generated by the wearable device according to the first electromagnetic signal; and if the second electromagnetic signal includes state switching information regarding the screen, switching the real-time state of the screen from the first state to a second state.

16 Claims, 11 Drawing Sheets

(51) Int. Cl.
*G06F 21/31* (2013.01)
*G06F 21/35* (2013.01)
*H04L 29/06* (2006.01)
*H04W 12/06* (2009.01)
*H04W 52/02* (2009.01)
*H04W 88/02* (2009.01)

(52) U.S. Cl.
CPC ............ *H04M 1/67* (2013.01); *H04W 12/06* (2013.01); *H04W 52/027* (2013.01); *H04W 52/0254* (2013.01); *G07C 2009/00809* (2013.01); *H04W 88/02* (2013.01); *Y02D 70/142* (2018.01); *Y02D 70/144* (2018.01); *Y02D 70/166* (2018.01); *Y02D 70/26* (2018.01)

(56) References Cited

U.S. PATENT DOCUMENTS

| | | | |
|---|---|---|---|
| 9,089,270 | B2 | 7/2015 | Song et al. |
| 9,510,197 | B2* | 11/2016 | De Leon ................ H04L 63/08 |
| 9,667,353 | B2* | 5/2017 | Åstrand ............... H04B 13/005 |
| 9,674,707 | B2* | 6/2017 | Boettcher ............ H04W 12/08 |
| 2006/0061468 | A1 | 3/2006 | Ruha |
| 2007/0145119 | A1 | 6/2007 | Rhelimi |
| 2011/0227856 | A1 | 9/2011 | Corroy et al. |
| 2013/0085410 | A1 | 4/2013 | Alberth et al. |
| 2013/0005303 | A1 | 10/2013 | Song et al. |
| 2013/0298226 | A1* | 11/2013 | Fang ...................... H04M 1/67 726/20 |
| 2014/0325614 | A1 | 10/2014 | Rhelimi |
| 2015/0058942 | A1* | 2/2015 | Dermu ................. G06F 21/445 726/6 |
| 2015/0149310 | A1 | 5/2015 | He et al. |
| 2015/0278498 | A1* | 10/2015 | Hong ..................... G06F 21/32 340/5.82 |
| 2015/0312669 | A1 | 10/2015 | Song et al. |
| 2015/0347738 | A1* | 12/2015 | Ulrich ..................... G06F 21/34 726/17 |
| 2016/0013872 | A1* | 1/2016 | strand ................. H04B 13/005 455/41.2 |
| 2016/0037345 | A1* | 2/2016 | Margadoudakis .. H04L 63/0853 455/411 |
| 2016/0154952 | A1* | 6/2016 | Venkatraman ...... H04L 63/0861 705/44 |
| 2016/0165442 | A1* | 6/2016 | Shi ........................ H04W 12/06 726/4 |
| 2016/0174025 | A1* | 6/2016 | Chaudhri ................ H04W 4/02 455/41.1 |
| 2016/0192193 | A1* | 6/2016 | Lee ...................... H04W 12/08 455/411 |
| 2016/0197916 | A1* | 7/2016 | Ravindran .......... H04L 63/0861 726/4 |
| 2016/0379205 | A1* | 12/2016 | Margadoudakis ... G06Q 20/327 705/71 |
| 2017/0086072 | A1 | 3/2017 | Mao et al. |
| 2017/0344737 | A1* | 11/2017 | Tang ........................ G06F 1/163 |
| 2018/0084106 | A1* | 3/2018 | Li ........................ H04W 76/14 |
| 2018/0103140 | A1* | 4/2018 | Donley ............... H04M 1/7253 |

FOREIGN PATENT DOCUMENTS

| | | | | |
|---|---|---|---|---|
| CN | 102866843 | A | 1/2013 | |
| CN | 103473514 | A | 12/2013 | |
| CN | 103560837 | A | 2/2014 | |
| CN | 103647587 | A | 3/2014 | |
| CN | 104036179 | A | 9/2014 | |
| CN | 104050402 | A | 9/2014 | |
| CN | 104091133 | A | 10/2014 | |
| CN | 104360731 | A | 2/2015 | |
| CN | 104363987 | A | 2/2015 | |
| CN | 104702792 | A | 6/2015 | |
| EP | 1096722 | A2 | 5/2001 | |
| EP | 2648130 | A1 | 10/2013 | |
| EP | 2720444 | A1 | 4/2014 | |
| EP | 3 133 894 | A1 * | 2/2017 | ............ H04W 88/02 |
| EP | 3 239 881 | A1 * | 11/2017 | |
| JP | 2007-189310 | A | 7/2007 | |
| JP | 2007-528054 | A | 10/2007 | |
| JP | 2012-511274 | A | 5/2012 | |
| JP | 2013-187879 | A | 9/2013 | |
| JP | 2014-123213 | A | 7/2014 | |
| JP | 2015-506131 | A | 2/2015 | |
| JP | 2015-177412 | A | 10/2015 | |
| JP | 2016-519500 | A | 6/2016 | |
| KR | 10-2006-0120207 | A | 11/2006 | |
| KR | 10-2014-0098837 | A | 8/2014 | |
| KR | 10-1772622 | | 8/2017 | |
| RU | 2532705 | C2 | 11/2014 | |
| WO | WO 2005/062236 | A2 | 7/2005 | |
| WO | WO 2010/064162 | A1 | 6/2010 | |
| WO | WO 2015/081326 | A1 | 6/2015 | |

OTHER PUBLICATIONS

Extended European Search Report issued in corresponding EP Application No. 15201683.8, mailed from the European Patent Office, dated Sep. 6, 2016.

English version of International Search Report of PCT/CN2015/093292, mailed from the State Intellectual Property Office of China dated Jan. 11, 2016.

Russian Office Action issued in Russian Patent Application No. 2016101407/08(001933), dated Mar. 3, 2017.

"Price or user experience—Millet Bracelet vs WeLoop Now Bracelet," Consumer Electronics, published Feb. 5, 2015, pp. 64-67.

* cited by examiner

METHODS AND APPARATUSES FOR CONTROLLING STATE OF TERMINAL SCREEN

CROSS-REFERENCE TO RELATED APPLICATIONS

This application is based upon and claims priority to Chinese Patent Application No. 201510126338.6, filed Mar. 20, 2015, the entire contents of which are incorporated herein by reference.

TECHNICAL FIELD

The present disclosure generally relates to the technical field of screen locking and, more particularly, to methods and apparatuses for controlling a state of a terminal screen.

BACKGROUND

To prevent a terminal from responding to an unintended touch by a user, or to save the electric power of the terminal, a screen of the terminal may be locked and unlocked by a user as needed. Conventionally, the user needs to press a power button on the terminal to lock the terminal screen, and needs to perform a click or swipe operation on the screen to unlock the screen.

SUMMARY

According to a first aspect of the present disclosure, there is provided a method for controlling a screen of a terminal, wherein the terminal includes a first human body communication component connected to a metal structure on a surface of the terminal, the method comprising: determining a real-time state of the screen as a first state; generating a first electromagnetic signal corresponding to the first state, and sending the first electromagnetic signal to the metal structure through the first human body communication component, such that the first electromagnetic signal is transmitted via a skin of a user; receiving, by the first human body communication component via the metal structure, a second electromagnetic signal sent by a wearable device associated with the terminal, the second electromagnetic signal being generated by the wearable device according to the first electromagnetic signal; and if the second electromagnetic signal includes state switching information regarding the screen, switching the real-time state of the screen from the first state to a second state.

According to a second aspect of the present disclosure, there is provided a method for controlling a screen of a terminal, wherein the method is used in a wearable device including a second human communication component connected to a metal structure on a surface of the wearable device, the method comprising: receiving, by the second human body communication component via the metal structure, a first electromagnetic signal sent by a first human body communication component of the terminal; if the first electromagnetic signal indicates that a real-time state of the screen is a first state, generating a second electromagnetic signal including state switching information regarding the screen; and sending the second electromagnetic signal to the metal structure through the second human body communication component, such that the second electromagnetic signal is transmitted to the terminal via a skin of a user.

According to a third aspect of the present disclosure, there is provided a terminal, comprising: a processor; a screen; and a memory for storing instructions executable by the processor; wherein the processor is configured to: determine a real-time state of the screen as a first state; generate a first electromagnetic signal corresponding to the first state, and send the first electromagnetic signal to a metal structure of the terminal, such that the first electromagnetic signal is transmitted via a skin of a user; receive, via the metal structure, a second electromagnetic signal from a wearable device associated with the terminal, the second electromagnetic signal being generated by the wearable device according to the first electromagnetic signal; and if the second electromagnetic signal includes state switching information regarding the screen, switch the real-time state of the screen from the first state to a second state.

According to a fourth aspect of the present disclosure, there is provided a wearable device, comprising: a processor; and a memory for storing instructions executable by the processor; wherein the processor is configured to: receive, via a second metal structure on a surface of the wearable device, a first electromagnetic signal generated by a terminal, the first electromagnetic signal being sent by the terminal via a first metal structure on a surface of the terminal; if the first electromagnetic signal indicates that a real-time state of a screen on the terminal is a first state, generate a second electromagnetic signal including state switching information regarding the screen; and send the second electromagnetic signal to the second metal structure on the surface of the wearable device, such that the second electromagnetic signal is transmitted to the terminal via a skin of a user.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
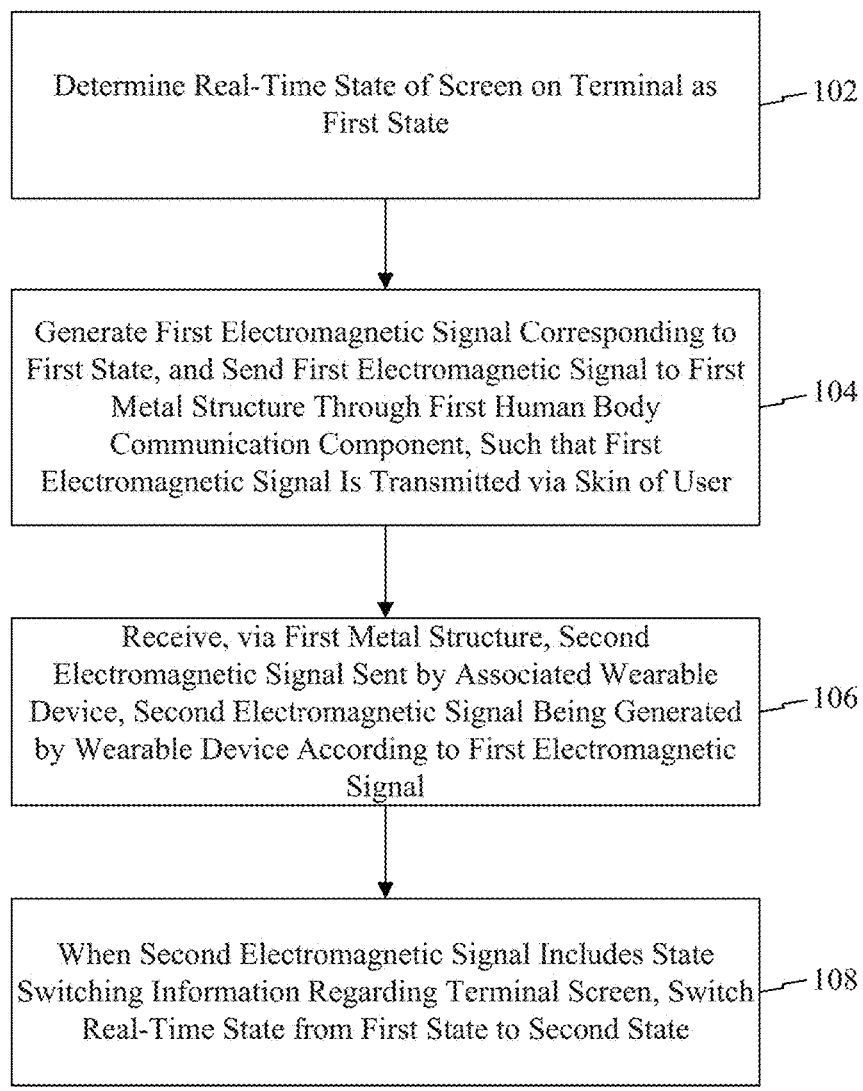
FIG. 1 is a flowchart of a method for controlling a state of a terminal screen, according to an exemplary embodiment.

FIG. 1 is a flowchart of a method 100 for controlling a state of a terminal screen, according to an exemplary embodiment. For example, the method 100 may be used in a terminal. The terminal may contain a first human body communication component connected to a first metal structure on a surface of the terminal. The method 100 may include the following steps.

In step 102, the terminal determines a real-time state of a screen on the terminal as a first state.

In step 104, the terminal generates a first electromagnetic signal corresponding to the first state, and sends the first electromagnetic signal to the first metal structure through the first human body communication component, such that the first electromagnetic signal is transmitted via the skin of a user.

In the present embodiment, the first electromagnetic signal may contain an identification bit corresponding to the real-time state. For example, when the identification bit is "0," it indicates that the real-time state is the first state. In contrast, when the identification bit is "1," it indicates that the real-time state is a second state. The first electromagnetic signal may contain other information, which is not limited by the present disclosure.

In the present embodiment, the first human body communication component in the terminal is connected to the first metal structure on the surface of the terminal. Therefore, when the first human body communication component sends the first electromagnetic signal to the first metal structure, if the user touches the first metal structure (or if the distance between the skin of the user and the first metal structure is shorter than or equal to a predetermined distance), the first human body communication component, the first metal structure, and part of the user's body, such as the skin of the user, may form a signal path to transmit the first electromagnetic signal.

In the present embodiment, the first metal structure on the surface of the terminal may be a metal casing or a part of the metal casing, a metal frame or a part of the metal frame, a metal logo of the terminal, or the like. The first metal structure may be located at a position not easily touched by the user during the normal usage of the terminal, so as to avoid unintended touches on the first metal structure.

In step 106, the first human body communication component receives, via the first metal structure, a second electromagnetic signal sent by an associated wearable device. The wearable device generates the second electromagnetic signal according to the first electromagnetic signal.

In the present embodiment, with the electromagnetic signals being transmitted by the human body, the first human body communication component in the terminal may receive the second electromagnetic signal returned by the wearable device. The second electromagnetic signal is configured to switch the real-time state of the terminal.

In step 108, when the second electromagnetic signal includes state switching information regarding the terminal screen, the terminal switches the real-time state from the first state to a second state.

For example, when the first state is a locking state and the second state is an unlocking state, the method 100 may be used to unlock the terminal screen. For another example, when the first state is an unlocking state and the second state is a locking state, the method 100 may be used to lock the terminal screen.

In the present embodiment, when the first state is a locking state and the second state is an unlocking state, the state switching information may include an unlocking password and first identification information. The first identification information is configured to notify the terminal to switch the real-time state of the terminal screen from the first state (i.e., locking state) to the second state (i.e., unlocking state).

Alternatively, when the first state is an unlocking state and the second state is a locking state, the state switching information includes second identification information. The second identification information is configured to notify the terminal to switch the real-time state of the terminal screen from the first state (i.e., unlocking state) to the second state (i.e., locking state).

Figure 2:
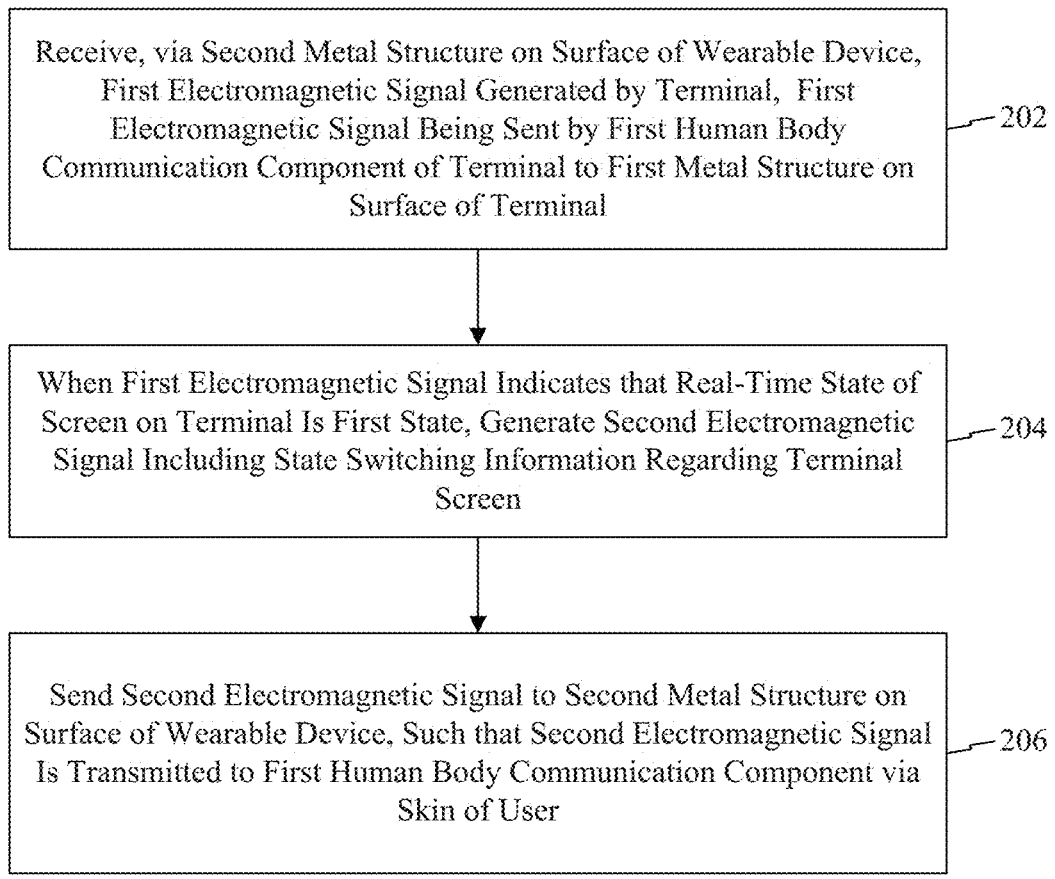
FIG. 2 is a flowchart of a method for controlling a state of a terminal screen, according to an exemplary embodiment.

FIG. 2 is a flowchart of a method 200 for controlling a state of a terminal screen, according to an exemplary embodiment. For example, the method 200 may be used in a wearable device. Referring to FIG. 2, the method 200 may include the following steps.

In step 202, a second human body communication component in the wearable device receives, via a second metal structure on a surface of the wearable device, a first electromagnetic signal generated by a terminal. A first human body communication component of the terminal sends the first electromagnetic signal to a first metal structure on a surface of the terminal.

In the present embodiment, the wearable device may be a smart bracelet, a smart ring, a pair of smart glasses, and the like. The present disclosure does not restrict the style or structure of the wearable device, as long as the second metal structure on the surface of the wearable device touches the skin of the user or keeps from the skin of the user at a distance shorter than or equal to a predetermined distance, so as to ensure the electromagnetic signal to be transmitted via the skin of the user.

In step 204, when the first electromagnetic signal indicates that a real-time state of a screen on the terminal is a first state, the wearable device generates a second electromagnetic signal including state switching information regarding the terminal screen.

In the present embodiment, when the first state is a locking state, the state switching information includes an unlocking password and first identification information. The first identification information is configured to notify the terminal to switch the real-time state of the terminal screen from the locking state to an unlocking state.

Alternatively, when the first state is an unlocking state, the state switching information includes second identification information configured to notify the terminal to switch the real-time state of the terminal screen from the unlocking state to a locking state.

In the present embodiment, the second electromagnetic signal may further include identity information used for indicating an association established between the wearable device and the terminal. For example, a matching operation may be performed in advance to associate the terminal with the wearable device. During the matching operation, the identity information may be generated and stored in the terminal and the wearable device. For instance, the identity information may include a series of validation characters. When receiving the second electromagnetic signal, the terminal may compare the identity information in the second electromagnetic signal with the identity information stored locally. If the two pieces of identity information match, the terminal may determine that the second electromagnetic signal is sent by the associated wearable device. If the two pieces of identity information do not match, the terminal may discard the second electromagnetic signal.

In step 206, the second human body communication component sends the second electromagnetic signal to the second metal structure on the surface of the wearable device, such that the second electromagnetic signal is transmitted to the first human body communication component via the skin of the user.

As illustrated by the above embodiments, in the present disclosure, human body communication components are respectively embedded in the terminal and the wearable device, and connected to the first metal structure and the second metal structure. Therefore, a signal channel may be established between the terminal and the wearable device via the skin of the user when the user touches the respective metal structures on the surfaces of the terminal and the wearable device. The electromagnetic signal transmitted in the signal channel may be used to lock and/or unlock the terminal screen, thereby enabling the user to quickly switch the terminal screen between the locking and unlocking states, improving the usage security of the terminal, and reducing the power consumption of the terminal.

In the following, exemplary embodiments consistent with the present disclosure are described.

1. Wearable Device

Figure 3:
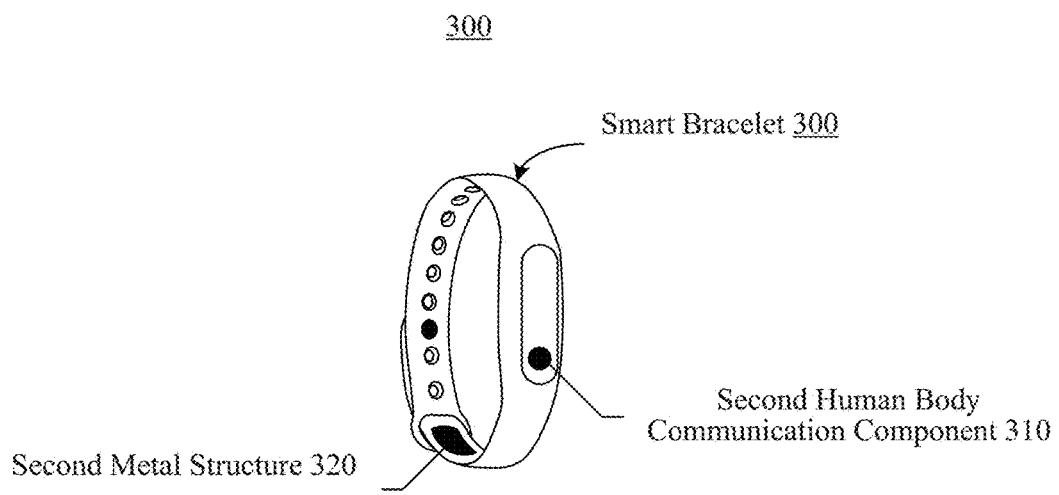
FIG. 3 is a schematic diagram of a wearable device, according to an exemplary embodiment.

FIG. 3 is a schematic diagram of a wearable device 300, according to an exemplary embodiment. Referring to FIG. 3, the wearable device 300 may be a smart bracelet 300. The smart bracelet 300 includes a second human body communication component 310 configured to send and receive an electromagnetic signal. Moreover, the surface of the smart bracelet 300 has a second metal structure 320. For example, as shown in FIG. 3, the second metal structure 320 may be a metal sheet connected to the second human body communication component 310 via a wire inside the smart bracelet 300.

Figure 4:
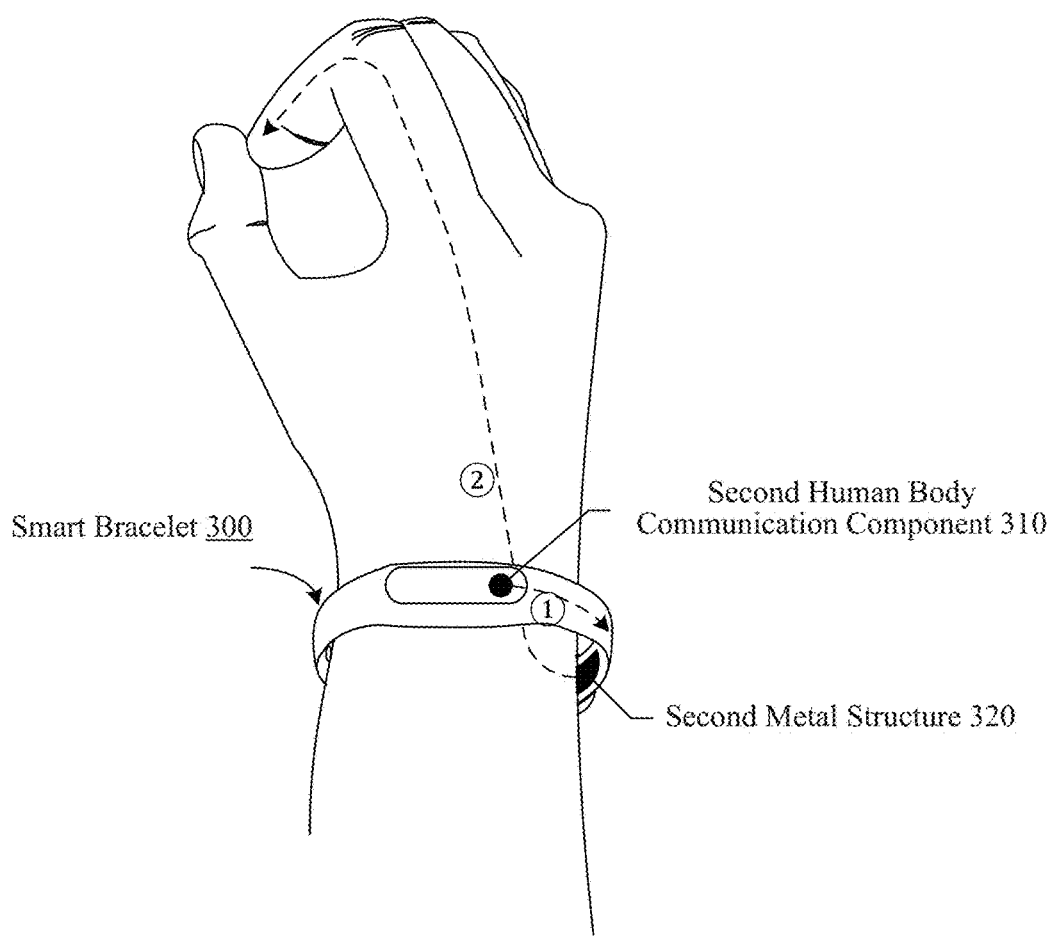
FIG. 4 is a schematic diagram illustrating achieving a signal transmission by a wearable device, according to an exemplary embodiment.

FIG. 4 is a schematic diagram illustrating achieving a signal transmission by a wearable device, according to an exemplary embodiment. In the example shown in FIG. 4, the wearable device may be the smart bracelet 300 (FIG. 3). When the user wears the smart bracelet 300 on his or her wrist, the second metal structure 320 may touch the skin on the wrist of the user, or may keep from the skin of the wrist in a distance shorter than or equal to a predetermined distance. Therefore, a communication path of the second human body communication component 310—the second metal structure 320—the skin of user, is formed, so as to realize the transmission of the electromagnetic signal. For example, still referring to FIG. 4, after the second human body communication component 310 generates an electromagnetic signal, the electromagnetic signal may be transmitted in the following manner: ① the second human body communication component 310 generates an electromagnetic signal, and sends the electromagnetic signal to the second metal structure 320 via the inner wire of the smart bracelet 300; and ② the electromagnetic signal travels to the skin on the wrist of the user via the second metal structure 320 and further travels along the skin to other parts of the user's body, such as a forefinger.

2. Terminal

Figure 5:
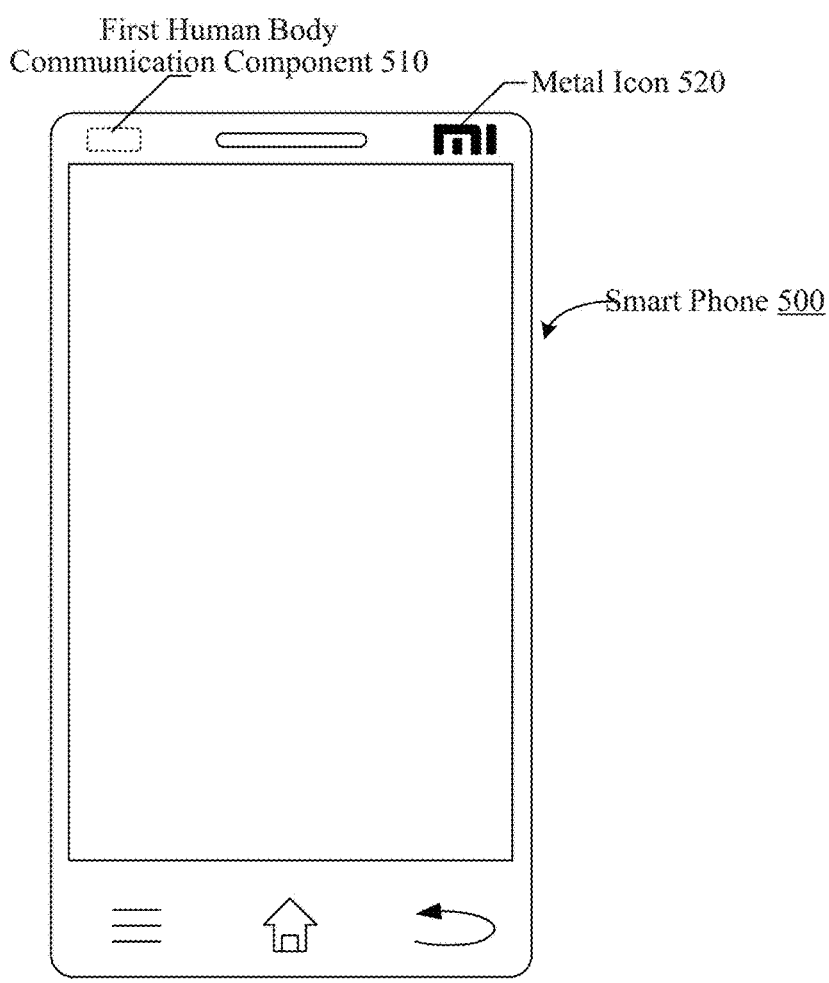
FIG. 5 is a schematic diagram of a terminal, according to an exemplary embodiment.

FIG. 5 is a schematic diagram of a terminal 500, according to an exemplary embodiment. Referring FIG. 5, the terminal 500 may be a smart phone 500. The smart phone 500 includes a first human body communication component 510, similar to the second human body communication component 310 (FIG. 3) and configured to send and receive an electromagnetic signal. Moreover, the surface of the smart phone 500 has a metal icon 520. For example, the metal icon 520 may be a metal logo 520 of the smart phone 500, and the metal logo 520 is connected to the first human body communication component 510 via a wire inside the smart phone 500. In exemplary embodiments, the metal icon 520 may also be in other forms, such as a metal frame or a metal backboard, which is not restricted by the present disclosure.

3. Cooperation of the Wearable Device and the Terminal

Figure 6:
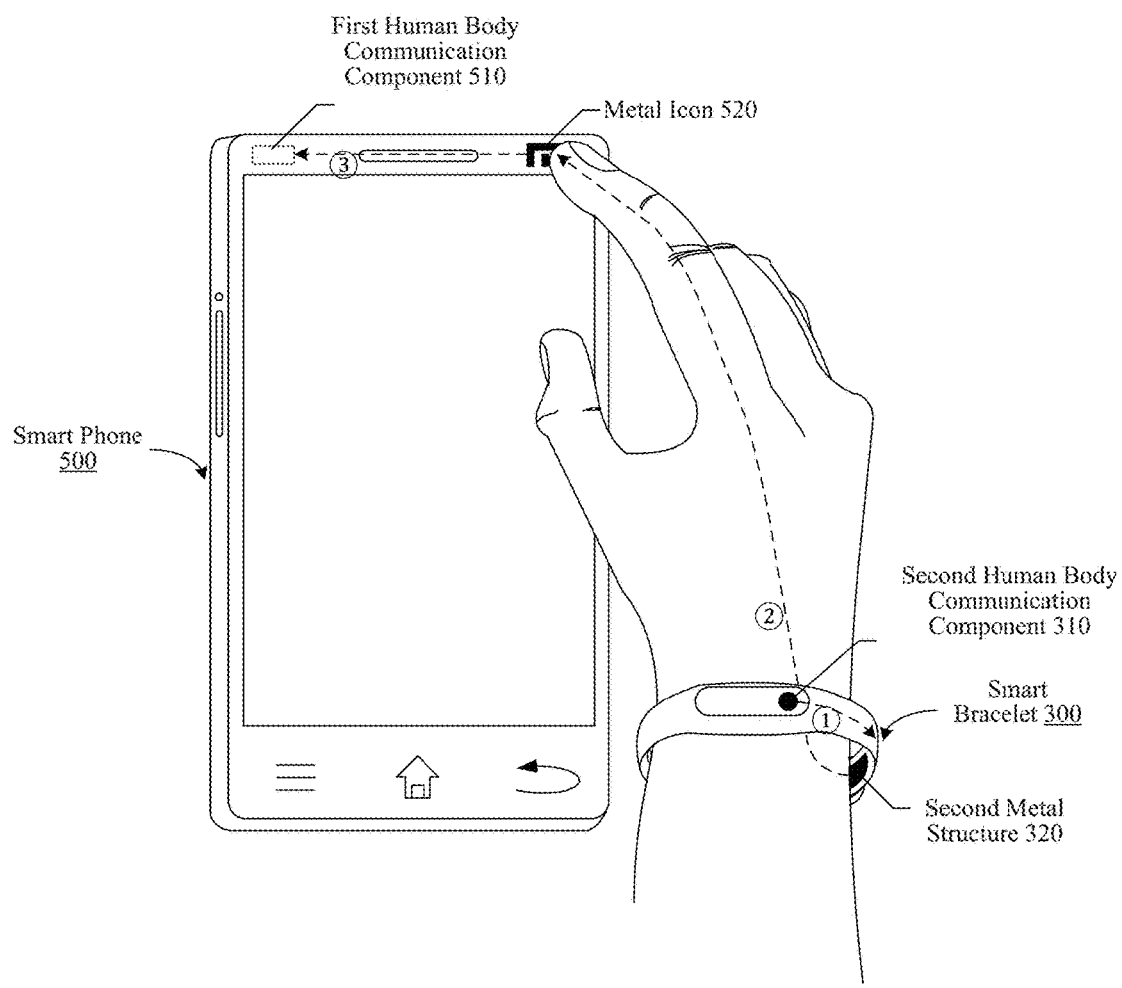
FIG. 6 is a schematic diagram illustrating achieving a signal transmission between a wearable device and a terminal, according to an exemplary embodiment.

FIG. 6 is a schematic diagram illustrating achieving a signal transmission between a wearable device and a terminal, according to an exemplary embodiment. In the example shown in FIG. 6, the wearable device may be the smart bracelet 300 (FIG. 3) and the terminal may be the smart phone 500 (FIG. 5). When the user wears the smart bracelet 300 and uses the smart phone 500, the following method may be used to switch a real-time state of the smart phone 500.

In a first step, a matching operation is performed to associate the smart bracelet 300 with the smart phone 500 in advance. After the association is established, the smart bracelet 300 stores therein an unlocking password of the smart phone 500. Moreover, each of the smart bracelet 300 and the smart phone 500 stores identity information used for validating the wearable device 300.

In some exemplary embodiments, if the security requirement is relatively low, i.e., if it is not required to validate the identity of the smart bracelet 300, then the above operations relating to the identity information may be omitted.

In a second step, to switch a real-time state of a screen on the smart phone 500, the user may touch the metal icon 520 or approach the metal icon 520 at a distance shorter than or equal to a predetermined distance.

After the association of the smart bracelet 300 and the smart phone 500 is established, the smart phone 500 may check the real-time state of the screen and periodically transmit a first electromagnetic signal to the metal icon 520. The first electromagnetic signal corresponds to the real-time state. When the user touches the metal icon 520, for example, by his or her forefinger, the user's body functions as a transmission medium to form an electromagnetic signal transmission path of the smart phone 500—the user's body—the smart bracelet 300. Therefore, the first electromagnetic signal may be transmitted to the second metal structure 320 of the smart bracelet 300 via the skin of the user, and then further transmitted to the second human body communication component 310.

Subsequently, the smart bracelet 300 may determine the real-time state of the screen according to the first electromagnetic signal, and generate a corresponding second electromagnetic signal. The smart bracelet 300 may then return the second electromagnetic signal to the smart phone 500 in the following manner ① the second human body communication component 310 transmits the second electromagnetic signal to the second metal structure 320; ② the second electromagnetic signal enters the user's body via the second metal structure 320, and travels to the metal icon 520 on the smart phone 500 along the user's forefinger; and ③ the second electromagnetic signal travels to the first human body communication component 510 via the metal icon 520, and then is processed by the first human body communication component 510 to facilitate the switching control of the real-time state.

If the screen of the smart phone 500 is initially in a locking state, then the second electromagnetic signal may include an unlocking password and first identification information. The first identification information is configured to notify the smart phone 500 to switch the real-time state from the locking state to an unlocking state. Conversely, if the screen of the smart phone 500 is initially in an unlocking state, then the second electromagnetic signal may include second identification information configured to notify the smart phone 500 to switch the real-time state from the unlocking state to a locking state.

Therefore, through the above-disclosed embodiments, the present disclosure uses the human body as a signal transmission medium, and uses the wearable device to effectively switch the real-time state of the a screen of the terminal. This manner not only improves the efficiency of locking and unlocking the terminal screen, but also improves the usage security of the terminal.

Figure 7:
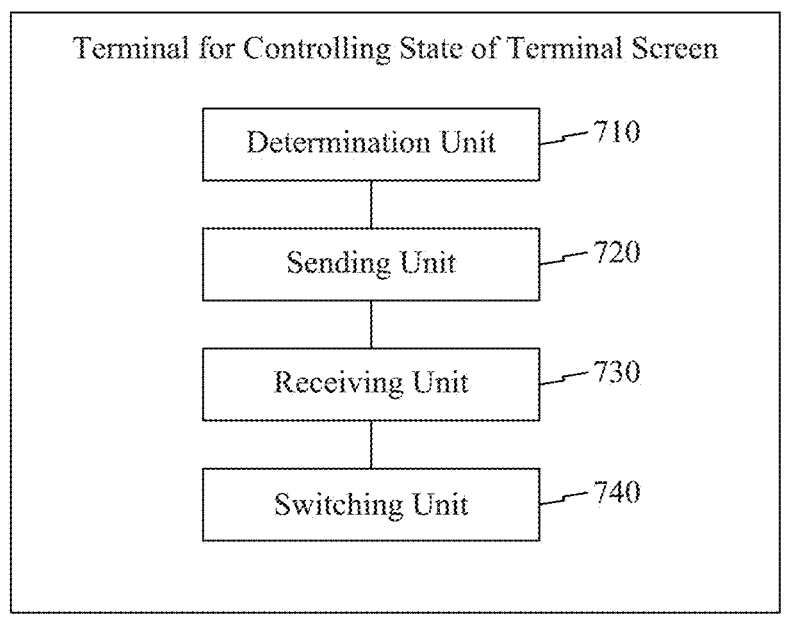
FIG. 7 is a block diagram of a terminal for controlling a state of a terminal screen, according to an exemplary embodiment.

FIG. 7 is a block diagram of a terminal 700 for controlling a state of a terminal screen, according to an exemplary embodiment. The terminal 700 contains a first human body communication component connected to a first metal structure on a surface of the terminal. Referring to FIG. 7, the terminal 700 includes a determining unit 710, a sending unit 720, a receiving unit 730, and a switching unit 740.

The determining unit 710 is configured to determine a real-time state of a screen on the terminal 700 as a first state.

The sending unit 720 is configured to generate a first electromagnetic signal corresponding to the first state, and send the first electromagnetic signal to the first metal structure, such that the first electromagnetic signal is transmitted via the skin of a user.

The receiving unit 730 is configured to receive, via the first metal structure, a second electromagnetic signal sent by an associated wearable device. The wearable device generates the second electromagnetic signal according to the first electromagnetic signal.

The switching unit 740 is configured to, when the second electromagnetic signal includes state switching information regarding the terminal screen, switch the real-time state of the terminal screen from the first state to a second state.

In exemplary embodiments, when the first state is a locking state and the second state is an unlocking state. The state switching information includes an unlocking password and first identification information. The first identification information is configured to notify the terminal to switch the real-time state of the terminal screen from the locking state to the unlocking state.

Alternatively, when the first state is an unlocking state and the second state is a locking state. The state switching information includes second identification information configured to notify the terminal to switch the real-time state of the terminal screen from the unlocking state to the locking state.

Figure 8:
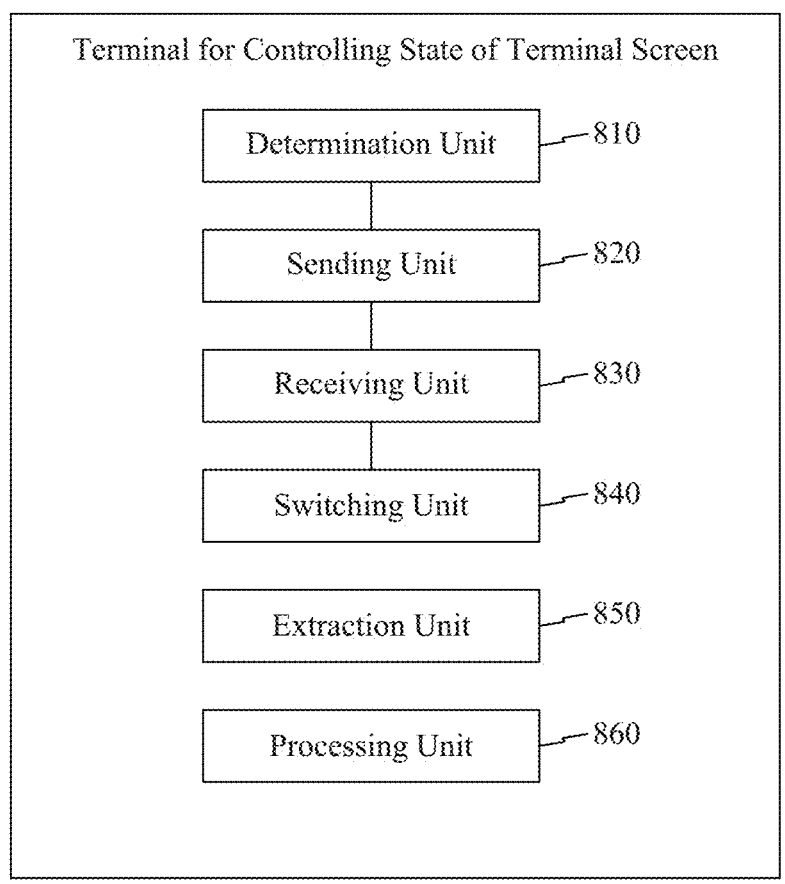
FIG. 8 is a block diagram of a terminal for controlling a state of a terminal screen, according to an exemplary embodiment.

FIG. 8 is a block diagram of a terminal 800 for controlling a state of a terminal screen, according to an exemplary embodiment. Referring to FIG. 8, the terminal 800 may include a determining unit 810, a sending unit 820, a receiving unit 830, and a switching unit 840, similar to the determining unit 710, the sending unit 720, the receiving unit 730, and the switching unit 740 (FIG. 7). In addition, the terminal 800 may further include an extraction unit 850 and a processing unit 860.

The extraction unit 850 is configured to extract identity information from the second electromagnetic signal and validate the identity information.

The processing unit 860 is configured to, if the identity information is valid, determine that the second electromagnetic signal is sent by the associated wearable device. The processing unit 860 is also configured to, if the identity information is invalid, discard the second electromagnetic signal.

Figure 9:
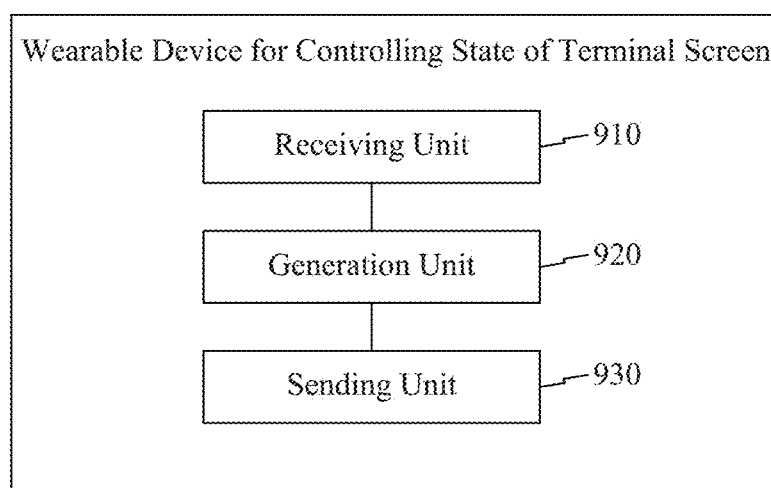
FIG. 9 is a block diagram of a wearable device for controlling a state of a terminal screen, according to an exemplary embodiment.

FIG. 9 is a block diagram of a wearable device 900 for controlling a state of a terminal screen, according to an exemplary embodiment. As shown in FIG. 9, the wearable device 900 includes a receiving unit 910, a generation unit 920, and a sending unit 930.

The receiving unit 910 is configured to receive, via a second metal structure on a surface of the wearable device 900, a first electromagnetic signal generated by a first human body communication component of a terminal. The first electromagnetic signal is sent by the first human body communication component to a first metal structure on a surface of the terminal The generation unit 920 is configured to, if the first electromagnetic signal indicates that a real-time state of a screen on the terminal is a first state, generate a second electromagnetic signal including state switching information regarding the terminal screen.

The sending unit 930 is configured to send the second electromagnetic signal to the second metal structure, such that the second electromagnetic signal is transmitted to the first human body communication component via the skin of a user.

In exemplary embodiments, when the first state is a locking state, the state switching information includes an unlocking password and first identification information. The first identification information is configured to notify the terminal to switch the real-time state of the terminal screen from the locking state to an unlocking state;

Alternatively, when the first state is an unlocking state, the state switching information includes second identification information configured to notify the terminal to switch the real-time state of the terminal screen from the unlocking state to a locking state.

In some exemplary embodiments, the second electromagnetic signal may further include identity information corresponding to the wearable device 900.

With respect to the terminals and wearable devices described in the above embodiments, the specific manners for performing various operations by the individual units therein have been described in detail in the embodiments regarding the methods, which will not be elaborated here.

Figure 10:
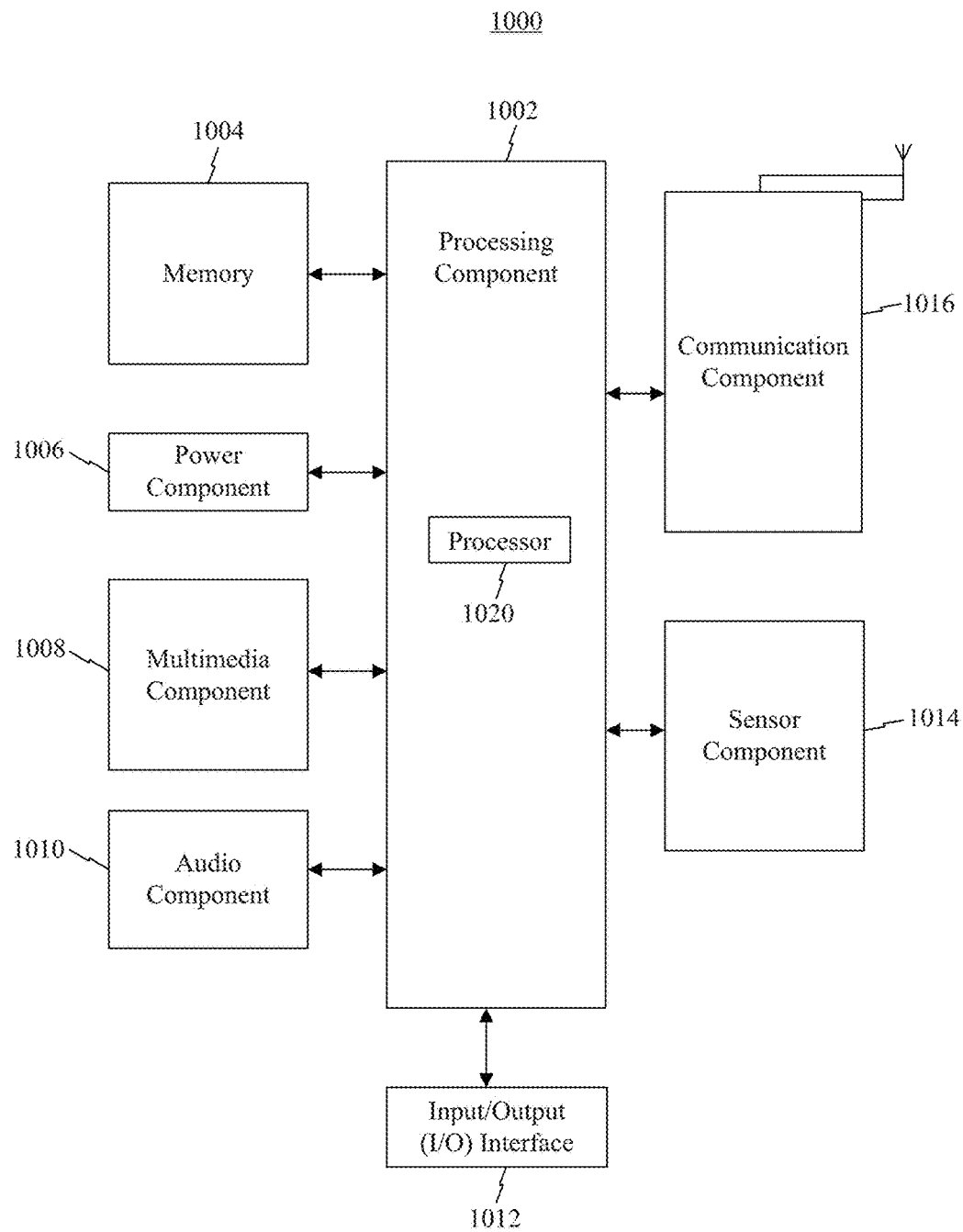
FIG. 10 is a block diagram of a terminal for controlling a state of a terminal screen, according to an exemplary embodiment.

FIG. 10 is a block diagram of a terminal 1000 for controlling a state of a terminal screen, according to an exemplary embodiment. For example, the terminal 1000 may be a mobile phone, a computer, a digital broadcast terminal, a messaging device, a gaming console, a tablet, a medical device, exercise equipment, a personal digital assistant, and the like.

Referring to FIG. 10, the terminal 1000 may include one or more of the following components: a processing component 1002, a memory 1004, a power component 1006, a multimedia component 1008, an audio component 1010, an input/output (I/O) interface 1012, a sensor component 1014, and a communication component 1016.

The processing component 1002 typically controls overall operations of the terminal 1000, such as the operations associated with display, telephone calls, data communications, camera operations, and recording operations. The processing component 1002 may include one or more processors 1020 to execute instructions to perform all or part of the steps in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the terminal 1000. Examples of such data include instructions for any applications or methods operated on the terminal 1000, contact data, phonebook data, messages, pictures, video, etc. The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the terminal 1000. The power component 1006 may include a power management system, one or more power sources, and any other components associated with the generation, management, and distribution of power in the terminal 1000.

The multimedia component 1008 includes a screen providing an output interface between the terminal 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1008 includes a front camera and/or a rear camera. The front camera and the rear camera may receive external multimedia data while the terminal 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 includes a microphone configured to receive an external audio signal when the terminal 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker to output audio signals.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The sensor component 1014 includes one or more sensors to provide status assessments of various aspects of the terminal 1000. For instance, the sensor component 1014 may detect an open/closed status of the terminal 1000, relative positioning of components, e.g., the display and the keypad, of the terminal 1000, a change in position of the terminal 1000 or a component of the terminal 1000, a presence or absence of user contact with the terminal 1000, an orientation or an acceleration/deceleration of the terminal 1000, and a change in temperature of the terminal 1000. The sensor component 1014 may include a proximity sensor configured to detect the presence of nearby objects without any physical contact. The sensor component 1014 may also include a light sensor, such as a CMOS or CCD image sensor, for use in imaging applications. In some embodiments, the sensor component 1014 may also include an accelerometer sensor, a gyroscope sensor, a magnetic sensor, a pressure sensor, or a temperature sensor.

The communication component 1016 is configured to facilitate communication, wired or wirelessly, between the terminal 1000 and other devices. The terminal 1000 can access a wireless network based on a communication standard, such as WiFi, 2G, 3G, 4G, or a combination thereof. In one exemplary embodiment, the communication component 1016 receives a broadcast signal or broadcast associated information from an external broadcast management system via a broadcast channel. In one exemplary embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1004, executable by the processor 1020 in the terminal 1000, for performing the above-described methods. For example, the non-transitory computer-readable storage medium may be a read-only memory (ROM), a random access memory (RAM), a CD-ROM, a magnetic tape, a floppy disc, an optical data storage device, and the like.

Figure 11:
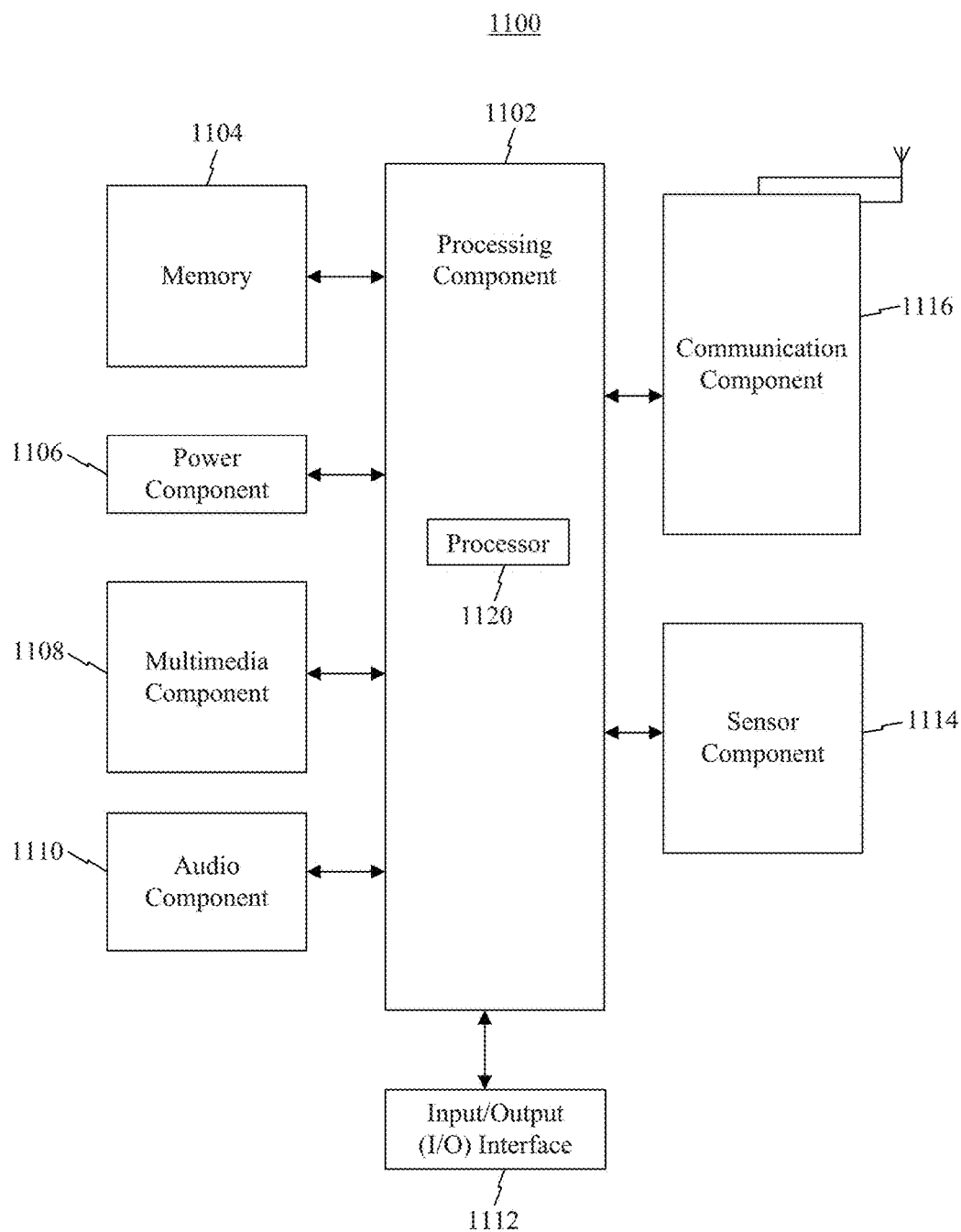
FIG. 11 is a block diagram of a wearable device for controlling a state of a terminal screen, according to an exemplary embodiment.

FIG. 11 is a block diagram of a wearable device 1100 for controlling a state of a terminal screen, according to an exemplary embodiment. For example, the wearable device 1100 may be a smart bracelet, a smart ring, and a pair of smart glasses.

Referring to FIG. 11, the wearable device 1100 may include one or more of the following components: a processing component 1102, a memory 1104, a power component 1106, a multimedia component 1108, an audio component 1110, an I/O interface 1112, a sensor component 1114, and a communication component 1116, similar to the processing component 1002, the memory 1004, the power component 1006, the multimedia component 1008, the audio component 1010, the I/O interface 1012, the sensor component 1014, and the communication component 1016, respectively (FIG. 10).

Similar to the terminal 1000, the wearable device 1100 may also be implemented with one or more ASICs, DSPs, DSPDs, PLDs, FPGAs, controllers, micro-controllers, microprocessors, or other electronic components, for performing the above described methods.

In exemplary embodiments, there is also provided a non-transitory computer-readable storage medium including instructions, such as included in the memory 1104, executable by the processor 1120 in the wearable device 1100, for performing the above-described methods. For example, the non-transitory computer-readable storage medium may be a ROM, a RAM, a CD-ROM, a magnetic tape, a floppy disc, an optical data storage device, and the like.

One of ordinary skill in the art will understand that the above-described modules/units can each be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for controlling a screen of a terminal, wherein the terminal includes a first human body communication component connected to a metal structure on a surface of the terminal, the method comprising:
    determining a real-time state of the screen as a first state;
    generating a first electromagnetic signal corresponding to the first state, and sending the first electromagnetic signal to the metal structure through the first human body communication component, such that the first electromagnetic signal is transmitted via a skin of a user;
    receiving, by the first human body communication component via the metal structure, a second electromagnetic signal sent by a wearable device associated with the terminal, the second electromagnetic signal being generated by the wearable device according to the first electromagnetic signal, and the second electromagnetic signal being transmitted to the metal structure when the metal structure is touched by the user, wherein a part of the user's body functions as a transmission medium to form an electromagnetic signal transmission path between the wearable device and the terminal; and
    if the second electromagnetic signal includes state switching information regarding the screen, switching the real-time state of the screen from the first state to a second state.

2. The method of claim 1, wherein
the first state is a locking state and the second state is an unlocking state, and
the state switching information comprises an unlocking password and first identification information, the first identification information being configured to notify the terminal to switch the real-time state of the screen from the locking state to the unlocking state.

3. The method of claim 1, wherein
the first state is an unlocking state and the second state is a locking state, and
the state switching information comprises second identification information configured to notify the terminal to switch the real-time state from the unlocking state to the locking state.

4. The method of claim 1, further comprising:
    extracting identity information from the second electromagnetic signal and validating the identity information;
    if the identity information is valid, determining that the second electromagnetic signal is sent by the associated wearable device; and
    if the identity information is invalid, discarding the second electromagnetic signal.

5. A method for controlling a screen of a terminal, wherein the method is used in a wearable device including a second human communication component connected to a second metal structure on a surface of the wearable device, the method comprising:
    receiving, by the second human body communication component via the second metal structure, a first electromagnetic signal sent by a first human body communication component of the terminal, the first electromagnetic signal being transmitted to a first metal structure on a surface of the terminal;
    if the first electromagnetic signal indicates that a real-time state of the screen is a first state, generating a second electromagnetic signal including state switching information regarding the screen; and
    sending the second electromagnetic signal to the second metal structure through the second human body communication component, such that the second electromagnetic signal is transmitted to the first metal structure when the first metal structure is touched by a user, wherein a part of the user's body functions as a transmission medium to form an electromagnetic signal transmission path between the wearable device and the terminal.

6. The method of claim 5, wherein
the first state is a locking state, and
the state switching information comprises an unlocking password and first identification information, the first identification information being configured to notify the terminal to switch the real-time state of the screen from the locking state to an unlocking state.

7. The method of claim 5, wherein
the first state is an unlocking state, and
the state switching information comprises second identification information configured to notify the terminal to switch the real-time state of the screen from the unlocking state to a locking state.

8. The method of claim 5, wherein the second electromagnetic signal further comprises identity information corresponding to the wearable device.

9. A terminal, comprising:
a processor;
a screen; and
a memory for storing instructions executable by the processor;
wherein the processor is configured to:
   determine a real-time state of the screen as a first state;
   generate a first electromagnetic signal corresponding to the first state, and send the first electromagnetic signal to a metal structure of the terminal, such that the first electromagnetic signal is transmitted via a skin of a user;
   receive, via the metal structure, a second electromagnetic signal from a wearable device associated with the terminal, the second electromagnetic signal being generated by the wearable device according to the first electromagnetic signal, and the second electromagnetic signal being transmitted to the metal structure when the metal structure is touched by the user, wherein a part of the user's body functions as a transmission medium to form an electromagnetic signal transmission path between the wearable device and the terminal; and
   if the second electromagnetic signal includes state switching information regarding the screen, switch the real-time state of the screen from the first state to a second state.

10. The terminal of claim 9, wherein
the first state is a locking state and the second state is an unlocking state, and
the state switching information comprises an unlocking password and first identification information, the first identification information being configured to notify the terminal to switch the real-time state of the screen from the locking state to the unlocking state.

11. The terminal of claim 9, wherein
the first state is an unlocking state and the second state is a locking state, and
the state switching information comprises second identification information configured to notify the terminal to switch the real-time state of the screen from the unlocking state to the locking state.

12. The terminal of claim 9, wherein the processor is further configured to:
extract identity information from the second electromagnetic signal and validate the identity information;
if the identity information is valid, determine that the second electromagnetic signal is sent by the associated wearable device; and
if the identity information is invalid, discard the second electromagnetic signal.

13. A wearable device, comprising:
a processor; and
a memory for storing instructions executable by the processor;
wherein the processor is configured to:
   receive, via a second metal structure on a surface of the wearable device, a first electromagnetic signal generated by a terminal, the first electromagnetic signal being transmitted to a first metal structure on a surface of the terminal;
   if the first electromagnetic signal indicates that a real-time state of a screen on the terminal is a first state, generate a second electromagnetic signal including state switching information regarding the screen; and
   send the second electromagnetic signal to the second metal structure on the surface of the wearable device, such that the second electromagnetic signal is transmitted to the first metal structure when the first metal structure is touched by a user, wherein a part of the user's body functions as a transmission medium to form an electromagnetic signal transmission path between the wearable device and the terminal.

14. The wearable device of claim 13, wherein
the first state is a locking state, and
the state switching information comprises an unlocking password and first identification information, the first identification information being configured to notify the terminal to switch the real-time state of the screen from the locking state to an unlocking state.

15. The wearable device of claim 13, wherein
the first state is an unlocking state, and
the state switching information comprises second identification information configured to notify the terminal to switch the real-time state of the screen from the unlocking state to a locking state.

16. The wearable device of claim 13, wherein the second electromagnetic signal further comprises identity information corresponding to the wearable device.

* * * * *